Feb. 24, 1959  M. D. LISTON  2,875,340
INSTRUMENTS
Filed Dec. 29, 1955  2 Sheets-Sheet 1

INVENTOR.
MAX D. LISTON
BY
Pollard Johnston Smythes Robertson
ATTORNEYS

Feb. 24, 1959　　　　　M. D. LISTON　　　　　2,875,340
INSTRUMENTS
Filed Dec. 29, 1955　　　　　　　　　　　　　2 Sheets-Sheet 2

INVENTOR.
MAX D. LISTON
BY
Pollard Johnston Smythe & Robertson
ATTORNEYS

United States Patent Office 2,875,340
Patented Feb. 24, 1959

2,875,340

INSTRUMENTS

Max D. Liston, Darien, Conn., assignor to Beckman Instruments, Inc., Fullerton, Calif., a corporation of California Application December 29, 1955, Serial No. 556,324

14 Claims. (Cl. 250—43.5)

This invention relates to optical analytical instruments and particularly to apparatus for the analyzation of gas mixtures.

In the use of analyzing apparatus for gas mixtures, it frequently is necessary to install the devices in areas involving explosion hazards wherein electrical or electronically operated devices may not be usable. Also, where graphic or visual control panels are employed having a plurality of instruments, pneumatic recorders frequently are required because of their relatively small size as compared with electrically operated controllers. In some installations, ease of maintenance and reliability make the use of pnuematic recorders or receivers desirable.

One of the objects of the invention is to provide an improved optical absorption type analyzer which permits use of relatively small and explosion proof arrangements.

Another of the objects of the invention is the provision of an optical analytical instrument which is adapted for use in conjunction with graphic control boards or panels.

In one aspect of the invention, a source of radiant energy is provided, said source in one form being of the infra-red type. A cell means or chamber is arranged for receiving the gas or mixture having the unknown element to be determined therein. In a preferred form, the radiant energy is arranged to pass through two parallel paths, although it also can be arranged so that a single path is used. A sensitive element or detector means is arranged in the path of the radiant energy, said sensitive means receiving the energy after it has passed through said cell means, the sensitive element means producing a signal. In one form, the sensitive element may be of the type shown in Patent No. 2,698,390 issued December 28, 1954, or Patent No. 2,681,415 issued June 15, 1954. Briefly, such an arrangement can have two chambers separated by a thin metal or similar diaphragm, said diaphragm preferably having an aperture therethrough, the diaphragm forming one plate of a capacitor. The other plate of the capacitor is fixed relative to said diaphragm. The aperture serves to equalize pressure between the two chambers and to compensate for long term changes in ambient temperature. The chambers are filled with the gas to be determined or with a gas having suitable radiation absorption characteristics in the region to be determined.

A source of radio frequency energy can be connected to said capacitor and an amplifier means having suitable electronic circuits can be connected to the capacitor plates so that the movement of the capacitor plates relative to each other will produce what can be termed an "error" signal.

When two paths of radiant energy are used, gas is located in each of the chambers of the sensitive element and is arranged to receive the radiant energy or infra-red rays, the sampling or absorption cell being placed in the path of rays to one of the chambers and a cell having gas therein being in the path of the other rays, said cell being either a reference cell or a balancing cell. A means can be provided to modulate the incidence of rays on the detector, such taking, for example, the form of the usual light chopper which simultaneously and periodically interrupts rays from the source means to the sensitive element. When a single path is used, the two cells can be placed in series. When radiant energy reaches the gas in the chambers or chamber of the sensitive element means or detector, energy will be absorbed only in the regions where the particular gas therein has absorption bands, the gas in the chamber expanding as a result thereof and causing relative movement of the capacitor plates. The amplifier may take various forms, such as, for example, an amplitude modulated circuit arrangement or a frequency modulated circuit arrangement.

When there is an unbalance due to the presence of the unknown in the sampling cell, the error signal from the amplifier is fed to an electric-to-air transducer. Such a transducer may have a magnetic means affecting a mechanism controlling the flow of air from a nozzle, as in the conventional flapper and nozzle pneumatic instrument arrangement. The flapper or vane preferably has low or no restoring force so that motion will be produced only when there is an error signal. The nozzle has air supplied thereto through a restricted orifice in the usual manner.

Nozzle pressure is connected to a pneumatically operated optical feedback means, the optical feedback means attenuating the signal seen by the sensitive element means so as to tend to re-establish balance or to produce a true null balance effect. The feedback means may take several forms. In one arrangement, the feedback means may include balancing cell means in which the pressure of the gas is increased or decreased to decrease or increase the radiant energy passing therethrough. In another form, a pneumatically driven balancing shutter can be used, intercepting or affecting the radiant energy passing through the reference cell.

A pneumatic monitoring means is connected to the output of the electric-to-air transducer, and may take the form of a pneumatic recorder, indicator, controller or similar arrangement.

The arrangement is useful particularly with the positive non-dispersion type of optical analytical instrument, but the principles also can be used in conjunction with spectrometers, colorimeters, or filter instrument optical comparators.

These and other objects, advantages and features of the invention will become apparent from the following description and drawings.

Figure 1:
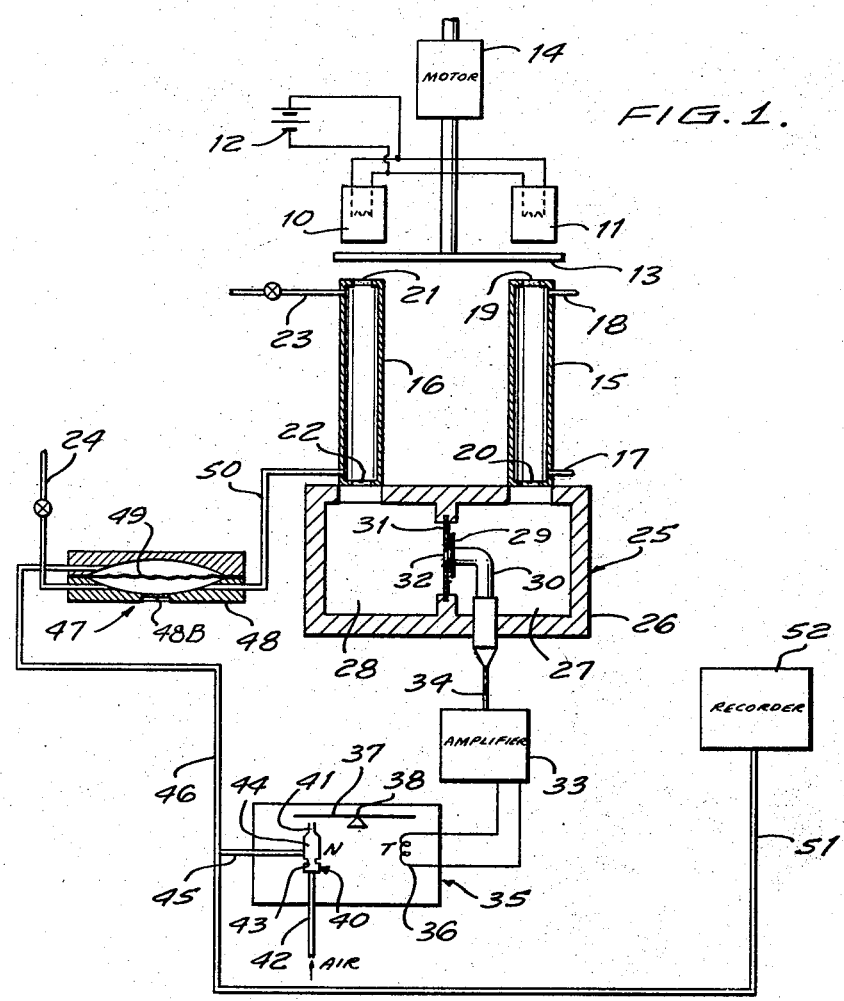
Fig. 1 shows diagrammatically one form of the invention.

The invention first will be described in conjunction with an arrangement wherein two ray paths are employed and the pressure of the gas in a balancing cell is varied in accordance with the amount of the unknown to be determined in the sample cell. Radiant energy or infra-red light sources 10, 11 are energized by a suitable source of electric current 12, said sources being arranged to give radiant energy rays of the desired wave length. Opaque shutter 13 can be suitably rotated by motor 14 to intercept rays from sources 10 and 11 simultaneously and periodically to modulate the incidence of the rays on the body of material or gas of the sensitive element 25.

Sample cell 15 can be arranged so that the gas mixture having the unknown is passed into the cell at 17 and exhausted at 18 or vice versa. The cell may have quartz windows 19 and 20 arranged so that rays from source 11 will pass through sample cell 15. The material chosen for the windows is selected so as to pass rays of wave lengths required for determination of the unknown. Balancing cell 16 has windows 21, 22 through which the rays from source 10 can pass. The interior of balancing cell 16 can be charged through pipes 23 or 24 with the gas to be determined.

Sensitive element means or detector 25 may be similar to that shown in Patent No. 2,681,415. The element means can consist of a case 26 having chambers 27 and 28 containing gas having absorption in the region of interest. Fixed plate 29 is supported by post 30 in close proximity to thin diaphragm plate 31, the diaphragm plate 31 having a small aperture 32 therein for the purpose of permitting equalization of pressures in chambers 27 and 28 and to compensate for ambient changes in temperature.

Amplifier means 33 can be connected to capacitor plate 29 through lead 34, case 26 being grounded or connected to the amplifier in the usual manner. Changes in the relative position of diaphragm 31 and fixed diaphragm 29 will produce an error signal which is amplified by amplifier 33. The signal so amplified is fed to electric-to-air transducer 35. Said transducer may, for example, include magnetic coil 36 which influences the pivoted armature or vane 37, said armature being pivoted at 38 in a suitable manner. Nozzle 40 cooperates with said vane or flapper 37 to control the flow of air from the small opening 41 through nozzle 40. Supply air is furnished to nozzle 40 through pipe 42 and the usual restriction 43.

Nozzle chamber 44 is connected through pipes 45 and 46 to the pneumatically operated optical feedback means for balancing cell 16. In the form shown in Fig. 1, the pressure in the balancing cell is changed by the air transducer including a chamber 48 having a flexible diaphragm 49 therein. Diaphragm 49 can be of the slack type and made of an impervious material such as that sold under the name "Teflon." Movement of diaphragm 49 will increase or decrease pressure in cell 16 through pipe 50 so as to change the energy passing through the cell. Window 48B can be provided to observe the position of the diaphragm.

The pressure in nozzle chamber 44 also can be connected through pipe 51 to pneumatically operated recorder 52 of any conventional type. The pneumatic recorder can be one, for example, having a bellows or bourdon tube arrangement therein for operating a pen or other recording arrangement. In place of the recorder 52, there could be a receiver pressure gauge or a controller of any suitable type.

Describing the operation of the feedback arrangement, as the absorption in the sample changes, there will be a difference in the absorption in chambers 27, 28. Such will cause an error signal to be fed to the amplifier, which in turn will actuate the optical feedback.

The system is charged with gas having absorption in the region which is to be determined so that its varying pressure will produce an optical balance between the two light paths as seen by the sensitive element means 25.

Figure 4:
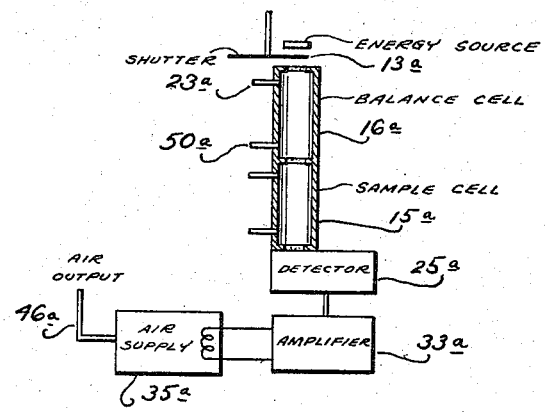
Fig. 4 is a fragmentary diagrammatic view of a still further form of the invention.

The balancing cell of Fig. 1 also could be placed in series with the sample cell as shown in Fig. 4 so as to reduce interference effects or rays from other absorbing gases in the unknown mixture, similar parts being given the same reference numeral with the letter *a* appended. In this type of optical attenuator, energy is absorbed only in the region of interest, thereby reducing effects of scattered light and varying absorption caused by the unknown in other regions.

Figure 2:
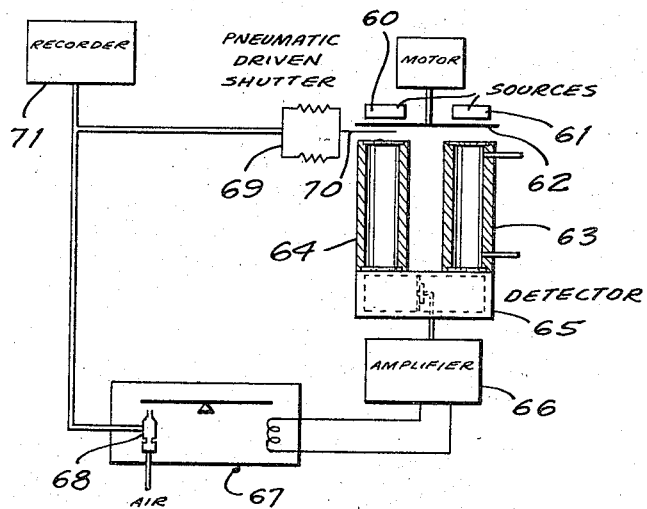
Fig. 2 shows diagrammatically another arrangement of the invention.

In another form of the invention as seen in Fig. 2, the optical feedback means can be in the form of a pneumatically driven wedge operated to change the amount of radiant energy passing through a reference cell instead of using an increase in gas pressure in a balancing cell as described for Fig. 1. Sources 60 and 61, and light shutter 62 for modulating the incidence of the rays on the detector, are used in the same manner as Fig. 1. Sample cell 63 and reference cell 64 are arranged with suitable windows at either end so that rays from the sources of radiant energy can pass therethrough to the sensitive element or detector 65. Change in the capacitor plates in sensitive element 65 will produce an error signal which can be fed to amplifier 66 to produce an error signal which is fed to the electric-to-air signal transducer means 67. The output pressure from nozzle 68 of transducer 67 is fed to a suitable air motor or bellows 69 connected to an opaque shutter or wedge 70. Pneumatic receiver means 71, which can be in the form of a recorder, indicator, or controller, also is connected to nozzle 68.

As an error signal is produced in the amplifier due to absorption of radiant energy in the sample cell, shutter 70 will be moved accordingly so as to produce a null condition in the electric-to-air signal transducer means, the pneumatically operated pneumatic feedback means changing the radiant energy passing through the reference cell 64 so as to produce said null condition.

The arrangement of Fig. 2 is particularly useful where interference problems are negligible, such being compensated for in the arrangement of Figs. 1 and 4.

Figure 3:
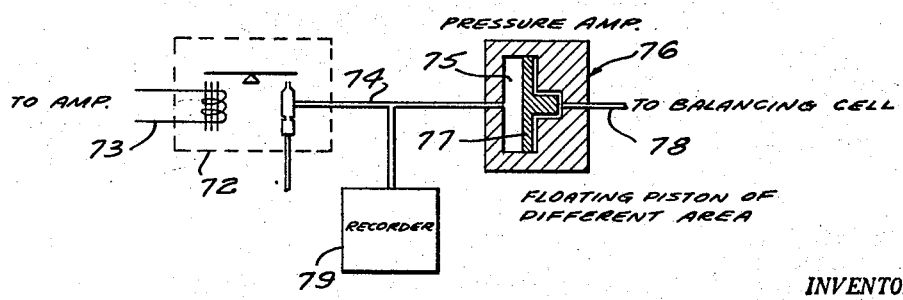
Fig. 3 is a fragmentary diagrammatic view of an amplifier arrangement which can be used with Figs. 1 and 2.

In some instances, the balancing movement required can be obtained by varying the balancing cell pressure of Fig. 1 within the standard range of commercial pneumatic controllers, such normally being from 3 to 15 pounds per square inch. If this is found to be insufficient, it is possible to add an air-amplifier arrangement, such as shown in Fig. 3. The electric-to-air signal transducer means 72 has a signal fed thereto from the amplifier through wires 73 to produce null pressure in pipe 74. The null output pressure in pipe 74 can be fed to chamber 75 of the pressure amplifier 76. Pressure amplifier 76 may have a conventional floating piston 77 therein with a different area on either side thereof, the higher pressure side being connected to pipe 78, which in turn is connected to balancing cell 16 of Fig. 1 or to bellows 69 of Fig. 2. The pneumatic receiving means 79 can be similar to means 52 of Fig. 1 or 71 of Fig. 2.

It is to be understood that details of construction and arrangement can be made without departing from the spirit of the invention except as defined in the appended claims.

What is claimed is:

1. In an optical absorption type analyzer, the combination including radiant energy source means, cell means for receiving the unknown substance, sensitive element means responsive to said radiant energy after the energy has passed through said cell means and producing a signal, amplifier means connected to said sensitive element means amplifying the signal therefrom, electric-to-air signal transducer means connected to said amplifier means, pneumatically operated optical feedback means attenuating the signal seen by said sensitive element means, and pneumatically operated monitoring means responsive to the magnitude of the output of said transducer.

2. In an optical absorption type analyzer, the combination including radiant energy source means, cell means for receiving the unknown substance, a body of material responsive to said radiant energy after the energy has passed through said cell means and producing an error signal, amplifier means responsive to said error signal and amplifying the same, electric-to-air signal transducer means connected to said amplifier means, pneumatically operated optical feedback means attenuating the signal seen by said sensitive element means so as to tend to re-establish balance, and pneumatically operated monitoring means responsive to the magnitude of the output of said transducer.

3. In an optical absorption type analyzer, the combination including radiant energy source means, cell means for receiving the unknown substance, sensitive element means having a body of material responsive to said radiant energy after the energy has passed through said cell to produce an error signal, balancing cell means having a substance therein in the path of rays from said energy source means to said sensitive element means, amplifier means connected to said sensitive element means amplifying the signal therefrom, electric-to-air signal transducer means connected to said amplifier means, pneumatically operated optical feedback means to attenuate the signal seen by said sensitive element means, said feedback means changing the pressure of the substance in the balancing cell in the path of the radiant energy to said sensitive element, and pneumatically operated monitoring means responsive to the magnitude of the output of said transducer.

4. In an optical absorption type analyzer, the combination including radiant energy source means, cell means for receiving the unknown substance, sensitive element means having a body of material responsive to said radiant energy after the energy has passed through said cell to produce an error signal, reference cell means having a substance therein in the path of rays from said energy source means to said sensitive element means, amplifier means connected to said sensitive element means amplifying the signal therefrom, electric-to-air signal transducer means connected to said amplifier means, pneumatically operated optical feedback means to attenuate the signal seen by said sensitive element means, said feedback means including means changing the radiant energy passing through said reference cell means, and pneumatically operated monitoring means responsive to the magnitude of the output of said transducer.

5. In an optical absorption type analyzer, the combination including radiant energy source means, cell means for receiving the unknown substance, sensitive element means having a body of material responsive to said radiant energy after the energy has passed through said cell to produce an error signal, reference cell means having a substance therein in the path of rays from said energy source means to said sensitive element means, amplifier means connected to said sensitive element means amplifying the signal therefrom, electric-to-air signal transducer means connected to said amplifier means, pneumatically operated optical feedback means to attenuate the signal seen by said sensitive element means, said feedback means including pneumatically movable shutter means for changing the radiant energy passing through said reference cell means, and pneumatically operated monitoring means responsive to the magnitude of the output of said transducer.

6. In an optical absorption type analyzer, the combination including radiant energy source means producing a plurality of beams of rays, first cell means for receiving the unknown substance and through which one of said beams of rays passes, a second cell means having a medium through which another of said beams of rays passes, sensitive element means responsive to said radiant energy of said one and said other beam after the energy has passed through said first and said second cell means and producing an error signal, amplifier means connected to said sensitive element means amplifying the signal therefrom, electric-to-air signal transducer means connected to said amplifier means, pneumatically operated optical feedback means attenuating the signal seen by said sensitive element means, and pneumatically operated monitoring means responsive to the magnitude of the output of said transducer.

7. In an optical absorption type analyzer, the combination including radiant energy source means producing a plurality of beams of rays, first cell means for receiving the unknown substance and through which one of said beams of rays passes, a second cell means having a medium through which another of said beams of rays passes, sensitive element means responsive to said radiant energy of said one and said other beam after the energy has passed through said first and said second cell means and producing an error signal, amplifier means connected to said sensitive element means amplifying the signal therefrom, electric-to-air signal transducer means connected to said amplifier means, pneumatically operated optical feedback means attenuating the signal seen by said sensitive element means, said feedback means changing the pressure of the medium in said second cell means, and pneumatically operated monitoring means responsive to the magnitude of the output of said transducer.

8. In an optical absorption type analyzer, the combination including radiant energy source means producing a plurality of beams of rays, first cell means for receiving the unknown substance and through which one of said beams of rays passes, a second cell means having a medium through which another of said beams of rays passes, sensitive element means responsive to said radiant energy of said one and said other beam after the energy has passed through said first and said second cell means and producing an error signal, amplifier means connected to said sensitive element means amplifying the signal therefrom, electric-to-air signal transducer means connected to said amplifier means, pneumatically operated optical feedback means attenuating the signal seen by said sensitive element means, said feedback means including shutter means for intercepting the beams of rays passing through said second cell means, and pneumatically operated monitoring means responsive to the magnitude of the output of said transducer.

9. In an optical absorption type analyzer, the combination including radiant energy source means, cell means for receiving the unknown substance, sensitive element means responsive to said radiant energy after the energy has passed through said cell means and producing an error signal, said sensitive element means including a body of material responsive to rays from said radiant energy means and having a variable capacitor responsive to changes in said body of material, means for modulating the incidence of radiant energy on said sensitive element means, amplifier means connected to said variable capacitor means amplifying the signal therefrom, electric-to-air signal transducer means connected to said amplifier means, pneumatically operated optical feedback means attenuating the signal seen by said sensitive element means, and pneumatically operated monitoring means responsive to the magnitude of the output of said transducer.

10. In an optical absorption type analyzer, the combination including radiant energy source means, cell means for receiving the unknown substance, sensitive element means responsive to said radiant energy after the energy has passed through said cell means and producing an error signal, amplifier means connected to said sensitive element means amplifying the signal therefrom, electric-to-air signal transducer means connected to said amplifier means, said transducer means including a flapper and nozzle movable relative to each other by the signal from said amplifier and producing an output pressure, pneumatically operated optical feedback means attenuating the signal seen by said sensitive element means, and pneumatically operated monitoring means responsive to the magnitude of the output of said transducer.

11. In an optical absorption type analyzer, the combination including radiant energy source means, cell means for receiving the unknown substance, sensitive element means responsive to said radiant energy after the energy has passed through said cell means and producing an error signal, amplifier means connected to said sensitive element means amplifying the signal therefrom, electric-to-air signal transducer means connected to said amplifier means, said transducer means including a flapper and nozzle movable relative to each other by the signal from said amplifier and producing an output pressure, an air pressure amplifier means connected to the output of said transducer, pneumatically operated optical feedback means connected to said air pressure amplifier means attenuating the signal seen by said sensitive element means, and pneumatically operated monitoring means responsive to the magnitude of the output of said transducer.

12. In an optical absorption type analyzer, the combination including radiant energy source means, cell means for receiving the unknown substance, sensitive element means having a body of material responsive to said radiant energy after the energy has passed through said cell to produce an error signal, cell means having an energy absorbing medium in the paths of rays from said energy source means to said sensitive element means, amplifier means connected to said sensitive element means amplifying the signal therefrom, electric-to-air signal transducer means connected to said amplifier means, pneumatically operated optical feedback means to attenuate the signal seen by said sensitive element means, said feedback means including a chamber having means responsive to the output of said transducer and changing the pressure of the substance in the path of the radiant energy to said sensitive element, and pneumatically operated monitoring means responsive to the magnitude of the output of said transducer.

13. In a positive type non-dispersion analyzer, the combination including radiant energy source means producing a beam of rays, cell means for receiving the unknown substance and through which said beam of rays can pass, a second cell means having an energy absorbing medium through which said beam of rays can pass, sensitive element means having a body of material therein responsive to said beam of rays after passing through said cell means producing an error signal, said first and said second element means including a variable capacitor having plates movable by changes in said body of material, one of said plates having an aperture therein to provide for changes in ambient temperature, amplifier means connected to said variable capacitor for amplifying the signal therefrom, electric-to-air signal transducer means connected to said amplifier means, said transducer means including a nozzle and flapper mechanism movable relative to each other by said amplified signal and producing a pneumatic output pressure, pneumatically operated optical feedback means attenuating the signal seen by said sensitive element means, and pneumatically operated monitoring means responsive to the magnitude of the output of said transducer.

14. In a positive type non-dispersion analyzer, the combination including radiant energy source means producing a plurality of beams, cell means for receiving the unknown substance and through which one of said beams can pass, a second cell means having a medium through which another of said beams can pass, sensitive element means having material therein responsive to said one and said other beam of rays after passing through said first and said second cell means producing an error signal, said element means including a variable capacitor having plates movable by changes in said body of material, one of said plates having an aperture therein to provide for changes in ambient temperatures, amplifier means connected to said variable capacitor for amplifying the signal therefrom, electric-to-air signal transducer means connected to said amplifier means, said transducer means including a nozzle and flapper mechanism movable relative to each other by said signal and producing a pneumatic output pressure, pneumatically operated optical feedback means attenuating the signal seen by said sensitive element means, and pneumatically operated monitoring means responsive to the magnitude of the output of said transducer.

References Cited in the file of this patent

UNITED STATES PATENTS

| 2,681,415 | Liston | June 15, 1954 |
| 2,718,597 | Heigl et al. | Sept. 20, 1955 |
| 2,731,877 | Clamann | Jan. 24, 1956 |
| 2,737,591 | Wright et al. | Mar. 6, 1956 |

UNITED STATES PATENT OFFICE

CERTIFICATE OF CORRECTION

Patent No. 2,875,340

February 24, 1959

Max D. Liston

It is hereby certified that error appears in the printed specification of the above numbered patent requiring correction and that the said Letters Patent should read as corrected below.

Column 7, line 35, after "said", first occurrence, insert -- first and said second --; line 36, before "element" strike out "first and said second".

Signed and sealed this 17th day of November 1959.

(SEAL)
Attest:

KARL H. AXLINE
Attesting Officer

ROBERT C. WATSON
Commissioner of Patents